(12) United States Patent
Pijnenburg

(10) Patent No.: US 12,372,292 B2
(45) Date of Patent: Jul. 29, 2025

(54) DEVICE FOR FRESH PRODUCE

(71) Applicant: KPB B.V., Helmond (NL)

(72) Inventor: Koen Pijnenburg, Helmond (NL)

(73) Assignee: KPB B.V., Helmond (NL)

(*) Notice: Subject to any disclaimer, the term of this patent is extended or adjusted under 35 U.S.C. 154(b) by 303 days.

(21) Appl. No.: 18/029,797

(22) PCT Filed: Sep. 29, 2021

(86) PCT No.: PCT/IB2021/058922
§ 371 (c)(1),
(2) Date: Mar. 31, 2023

(87) PCT Pub. No.: WO2022/070081
PCT Pub. Date: Apr. 7, 2022

(65) Prior Publication Data
US 2023/0358459 A1    Nov. 9, 2023

(30) Foreign Application Priority Data
Oct. 1, 2020 (NL) ..................... 2026601

(51) Int. Cl.
*F25B 21/02* (2006.01)
*F25D 17/04* (2006.01)
*F25D 17/06* (2006.01)

(52) U.S. Cl.
CPC ............ *F25D 17/042* (2013.01); *F25B 21/02* (2013.01); *F25D 17/06* (2013.01); *F25B 2321/0251* (2013.01); *F25D 2317/0413* (2013.01)

(58) Field of Classification Search
CPC ......... A23B 7/148; A23B 7/158; F25B 21/02; F25B 2321/0251; F25D 17/042; F25D 17/06; F25D 2317/0413
See application file for complete search history.

(56) References Cited

U.S. PATENT DOCUMENTS 4,860,555 A    8/1989   Bishop et al.
6,658,858 B1  12/2003   Thompson et al.
(Continued)

FOREIGN PATENT DOCUMENTS

CN    203028768 U    7/2013
CN    108826558 A    11/2018
(Continued)

OTHER PUBLICATIONS

International Search Report and Written Opinion corresponding to International Application No. PCT/IB2021/058922 dated Dec. 10, 2021.

(Continued)

*Primary Examiner* — Filip Zec
(74) *Attorney, Agent, or Firm* — Jenkins, Taylor & Hunt, P.A.

(57) ABSTRACT

Device for keeping fresh produce conditioned, particularly for fruit, comprising a receptacle with a substantially cup-shaped chamber which is enclosed by a wall and conditioning means, wherein the conditioning means comprise at least a cooling device (35) and at least an air displacing device (55), wherein a cavity (25) comprises at least one air channel (25, 27) which is in open communication with the air displacing device so as to guide the forced airflow at least partially, and wherein an inner wall (21) is provided in the bottom with perforations (28) which maintain an open communication between the chamber and at least one of the at least one air channel.

20 Claims, 4 Drawing Sheets

(56) References Cited

U.S. PATENT DOCUMENTS

| | | | |
|---|---|---|---|
| 10,299,525 B1 * | 5/2019 | Buckman | A42B 1/008 |
| 10,730,364 B2 * | 8/2020 | Henkel | F24F 5/0042 |
| 12,215,898 B2 * | 2/2025 | Itzkowitz | A47J 27/08 |
| 2004/0194495 A1 | 10/2004 | Gleason et al. | |
| 2009/0152258 A1 * | 6/2009 | Schandel | A47J 27/004 |
| | | | 219/439 |
| 2011/0259019 A1 | 10/2011 | Chang | |
| 2014/0044851 A1 * | 2/2014 | Kennedy | A47J 36/321 |
| | | | 99/332 |
| 2014/0096687 A1 * | 4/2014 | Evans | A47J 43/0727 |
| | | | 366/144 |
| 2016/0201018 A1 * | 7/2016 | Watson | A47J 27/08 |
| | | | 426/11 |
| 2018/0028012 A1 * | 2/2018 | Junge | A47J 27/004 |
| 2019/0269272 A1 * | 9/2019 | Itzkowitz | A47J 36/321 |
| 2023/0184484 A1 * | 6/2023 | Babucke | F25D 17/062 |
| | | | 454/173 |

FOREIGN PATENT DOCUMENTS

| | | |
|---|---|---|
| EP | 1 684 592 A | 8/2006 |
| TW | 201136511 A | 11/2011 |
| WO | WO-2005/039304 A1 | 5/2005 |

OTHER PUBLICATIONS

Office action corresponding to Taiwan Patent Application No. 110136489 dated Dec. 31, 2024, 26 Pages.

* cited by examiner

DEVICE FOR FRESH PRODUCE

CROSS REFERENCE TO RELATED APPLICATIONS

This application is a national stage filing of PCT International Patent Application No. PCT/IB2021/058922, filed Sep. 29, 2021, which is based on and claims priority to Netherlands Patent Application No. 2026601 filed Oct. 1, 2020.

The present invention relates to a device for keeping fresh produce conditioned, particularly for fruit, comprising a receptacle with a substantially cup-shaped chamber which is enclosed by a wall and in which the fresh produce can be received, and conditioning means intended and configured to influence an ambient climate in the chamber, wherein the wall comprises adjacently of the chamber an inner wall which defines a bottom of and a peripheral edge remote from the bottom of the chamber.

Such a device is for instance known from a Chinese utility model which was published under the number CN 203028768. The device shown therein comprises at the bottom of the receptacle a water reservoir which is connected to a central mast. The mast extends above the chamber and comprises a set of spray arms with an sprayer device for spreading an aerosol over the chamber. This has for its object to moisten fruit accommodated in the chamber in order to prevent drying out and to thereby keep the fruit fresh for longer.

It has been found that fruit can thus be kept fresh and edible significantly longer. The mist which is spread over the fruit provides for a saturated air humidity around the fruit, whereby evaporation from the fruit is limited to a minimum. A drawback of the known device is however that a considerable part of the aerosol is given off to the area surrounding the device, this resulting in a substantial consumption of water. The water reservoir has only a limited volume and must therefore be filled up regularly. The known device further does not have a control which, depending on the type of produce, aims for optimal conditions for the specific fresh produce.

The present invention has for its object, among others, to provide a device of the type stated in the preamble which consumes no or less liquid and/or whereby the nature of the fresh produce to be stored can be catered to more effectively.

To achieve the stated object a device of the type stated in the preamble has the feature according to the invention that the wall comprises at least one second wall which maintains an intermediate cavity with the inner wall, wherein the conditioning means comprise at least a cooling device and at least an air displacing device, wherein the air displacing device is able and configured to generate and maintain, optionally intermittently, a forced airflow during operation, wherein the cooling device is able and configured to enter on a cold side thereof into heat-exchanging contact with the airflow and to extract heat therefrom, wherein the cavity comprises at least one air channel which is in open communication with the air displacing device so as to guide the forced airflow at least partially, and wherein the inner wall is provided in the bottom with perforations which maintain an open communication between the chamber and at least one of the at least one air channel.

A first particular embodiment of the device has the feature according to the invention here that the at least one second wall comprises an outer shell of the device, that the inner wall and the outer shell maintain relative to each other at the peripheral edge an air gap directed toward the chamber and that the at least one air channel opens into the air gap.

A second particular embodiment has the feature according to the invention that the at least one second wall comprises an intermediate wall between an outer shell of the device and the inner wall, and that the intermediate wall defines together with the bottom of the inner wall a chamber which is in open communication with the outlet of the air displacing means. A preferred embodiment of the device has the feature here that the intermediate wall comprises a thermal conductor, particularly is formed from metal, which is in heat-exchanging contact with the cold side of the cooling device.

The air displacing device and the cooling device together provide for a cooled air circulation through the chamber in which the fresh produce is kept. By cooling the air and guiding it through the chamber a cooler atmosphere can be established therein than in an area surrounding the device, whereby on the one hand the relative air humidity increases further and on the other a ripening process of the produce is inhibited. This airflow is guided via the at least one air channel in the cavity of the wall to the chamber. The double wall thereby provides not only for an insulating function but also contributes actively to maintaining a cool climate inside the receptacle, whereby degradation processes are inhibited and the fresh produce can be protected against spoiling for longer.

A preferred embodiment of the device according to the invention has the feature here that the inner wall and at least one of the at least one second wall are spatially separated from each other by a number of spacers which extend therebetween in a transverse direction and which mutually bound a number of individual cavity channels, and that the cavity channels each comprise an air channel through which the airflow is maintained, at least during operation. This at least partially lateral enclosure of the airflow between the flanking spacers counteracts excessive divergence of the airflow in order to thus maintain a substantially forward-directed airflow which will be able to penetrate sufficiently far into the chamber and will require a smaller air displacement (power) from the air displacing device.

The device provides a continuous air ventilation in the chamber and is able to discharge and/or to limit a possible surplus of moisture in the chamber. Temperature and moisture sensors coupled to an electronic control device of the device can here in particular be provided in the circulating airflow. It is thereby possible to actively intervene in the internal climate management of the device, if necessary. The airflow which is carried by means of the air displacing device through the chamber and over the fresh produce particularly provides for dissipation of a relatively humid boundary layer between the fresh produce and the surrounding air. This has been found in particular to suppress or at least counteract the development of *botrytis* (fungal damage) on the fresh produce.

The fresh produce is here particularly vegetables and fruit. Fruit types can be divided into climacteric fruit and non-climacteric fruit. Climacteric fruit continues to mature to full ripeness even after being harvested and separated from the plant. This fruit develops additional flavour even after harvesting by converting starch into sugars. Non-climacteric fruit however ripens only on the plant. Once harvested, non-climacteric fruit no longer continues to ripen. The device according to the invention is able to cater to this distinction by adapting a climate in the chamber to the type of fresh produce and, for instance in the case of climacteric fruit, accelerating or decelerating the ripening process depending on the user's wishes.

A lot of fresh produce, particularly fruit, has been found to be subject to both ripening and evaporation, causing the condition thereof to deteriorate. In a particular embodiment the device according to the invention therefore has the feature that the conditioning means comprise at least one sprayer device which is able and configured to generate during operation and optionally intermittently an aerosol from a liquid and deliver it to the airflow, wherein the at least one air channel is in open communication with the outlet of the air displacing device. The ripening process is already slowed down significantly by the cooling of the air. By thus also distributing an aerosol over the fresh produce the relative air humidity around the fresh produce can be increased, whereby excessive evaporation is also reduced. This further extends the shelf life of the produce.

The (relative) air humidity in the chamber usually plays a significant role in the condition and shelf life of a lot of fresh produce. On the one hand a low air humidity can result in more evaporation and, eventually, drying out or shrivelling of the produce. On the other hand an air humidity, and particularly condensation, which is too high can result in rotting and fungal growth. The device according to the invention also provides a solution here, for instance by selecting the right balance and raising the air humidity to a maximum of 85-95%, which appears to be a suitable compromise for for instance tomatoes. Strawberries however are protected from drying out for longer if a thin layer of condensation lies thereon at a storage temperature of between 8 and 18° C., which is possible in the device according to the invention by maintaining a cool climate and a saturated air humidity in the chamber by controlling both the cooling device and the sprayer device. A similar regimen applies to peppers, albeit that the relative air humidity is in this case kept a minimum of 10% below the saturation level in order to create in the chamber a vapour pressure deficit which counteracts rotting.

The sprayer device gives off the liquid mist on the blow-out side of the air displacing device. The generated mist is then entrained by the generated airflow and introduced via an outlet of the at least one air channel into the chamber. The aerosol is thus carried particularly effectively and efficiently into the chamber, wherein it is prevented that aerosol can also escape to the area surrounding the device. Waste of liquid to the environment is thereby limited. Although the device already has an air humidity in the chamber under control to significant extent owing to constant air ventilation, in this embodiment the device is additionally able to for instance periodically increase the air humidity briefly or even to form condensation in order to prevent excessive drying out of the produce. It has been found that, owing to such a combined air and aerosol inlet, a particularly homogenous, effective and efficient distribution of the aerosol over the chamber can be achieved, which results in a relatively low liquid consumption.

Sprayer devices exist in many forms and sizes and are in principle all suitable for application in the device according to the invention. What they have in common is that a fine mist or vapour is formed from a liquid, such as in this case in particular optionally pure water, which mist or vapour is referred to in the present application as aerosol irrespective of the manner in which it was generated. Particularly good results have in this respect been achieved with a particular embodiment of the device according to the invention with the feature that the sprayer device comprises an ultrasonic nozzle with an electromechanical transducer, particularly a piezoelectric transducer, which is intended and configured to act with an ultrasonically energizable nozzle member on a liquid, particularly water, and form the aerosol therefrom. The air displacing device is here configured such that the airflow will be carried over the liquid at the position of the nozzle member. In this embodiment the liquid is sprayed by means of an ultrasonically vibrating member, after which the formed mist is entrained by the airflow into the air channel and the air or aerosol inlet of the chamber. Such a piezoelectric nozzle is characterized by a relatively high mist production.

In an alternative embodiment the device according to the invention is characterized in that the sprayer device comprises at least one jet sprayer with a spray nozzle which is provided with at least one continuous spray opening and is intended and configured to receive at an inlet a liquid, particularly water, under increased pressure and to give off the liquid in the form of the aerosol at an outlet of the spray opening. The application of one or more of such jet sprayers allows a particularly compact construction and integration in the device, which can be so small that the nozzle can eminently be accommodated in or close to the peripheral edge close to the air channel outlet to the chamber. A further particular embodiment of the device therefore has the feature that the spray nozzle is arranged in or close to the peripheral edge and is oriented with the outlet toward the interior of the chamber.

The device can optionally be connected to a fixed water main and in that case be provided with a fixed water connection serving for this purpose. For a more autonomous operation a further preferred embodiment of the device according to the invention however has the feature that a liquid reservoir forms a removable part of the receptacle and is in permanent or switched connection with the sprayer device. A preferred embodiment of the device has the feature here that a liquid conduit connects the sprayer device to a liquid reservoir and that the liquid conduit extends in the cavity between the inner wall and the at least one second wall. Although the liquid reservoir must be filled up if the liquid level therein has dropped below a minimum, a relatively long continuous operation can still be achieved owing to the particularly efficient and thereby low water consumption according to the invention. On the other hand, the receptacle can thus be arranged at almost any suitable location. The liquid reservoir is advantageously a water reservoir, and directly accessible and removable on an outer side of the receptacle in order to be filled up. The reservoir has a capacity which is sufficient for at least several days of operation of the device.

In a further particular embodiment the device according to the invention has water recovering means which are able and configured to make water vapour from the air precipitate in the form of condensation and to collect it. This condensed water is then available for the sprayer device, which thus nevertheless has an option, both with but also without fixed water connection or removable reservoir, to regulate the moisture balance in the chamber by carefully controlling the relative humidity therein. This relative humidity around a product subject to evaporation can be adjusted up or down by means of respectively increasing or reducing the airflow through the chamber, while spraying of such condensed water can give an additional boost thereto. The cooling device and/or the components cooled thereby advantageously form part of such condensation recovering means.

A particular embodiment of the device according to the invention has the feature that the cooling device comprises a heat exchanger which is thermally coupled to a cooling body with cooling ribs which are in heat-exchanging contact with the airflow. The airflow is here guided in between and along the cooling ribs, which results in a particularly efficient and effective heat transfer from the air to the cooling body. The cooled air provides for a reduction of the ambient temperature in the chamber, which can thus particularly be maintained below or around a dew point. Because cold air is able to contain less water vapour than warmer air, cold air will become saturated more quickly, i.e. with less water vapour, than warmer air. The cooled air thus limits a possible water consumption required to create and maintain an optimal relative air humidity in the chamber.

A particularly silent cooling is achieved with a preferred embodiment of the device according to the invention, characterized in that the heat exchanger comprises at least one Peltier element. A Peltier element is a thermoelectric solid state semiconductor element and is applied here to extract heat from the airflow. Other names for a Peltier element are: Peltier cooler, Peltier heater, thermoelectric heat pump, Peltier diode, Peltier heat pump, solid state cooler, semiconductor cooler and thermoelectric cooler. The Peltier element functions as active heat pump which transports heat counter to the temperature gradient, i.e. from cold to hot; in this case from the airflow to the area surrounding the receptacle. A heat pump without moving parts or liquids is thereby realized. This pump is therefore very low-maintenance and, in principle, completely silent and vibration-free.

An embodiment of the device which is particularly attractive from both a practical and an aesthetic viewpoint has the feature that the receptacle comprises a bowl which supports on a hollow pedestal and that the conditioning means are accommodated at least largely in the pedestal. The pedestal thus accommodates particularly the cooling device and the air displacing device, which form part of the conditioning means, and optionally further electronics of the receptacle, such as for instance a control unit and optional accessories such as a microphone/loudspeaker and/or telecommunications module. The invention thereby provides a fully functional device which can particularly be embodied in a handy tabletop size, whereby a climate around the fresh produce can be controlled to at least significant extent.

In order to further enhance the operation of the receptacle a further particular embodiment of the device according to the invention has the feature that at least one light source is provided therein for the purpose of visibly displaying a lighting effect, particularly an annular light source, more particularly in the form of one or more LEDs. Such a light source can for instance be provided in the edge, particularly an annular light source which extends over the edge at least substantially all the way around, but can for instance also be a ring which extends round an operating button. The light source can here shine continuously or only light up or change colour to indicate for instance a determined operating state, such as for instance in the case of a malfunction such as to indicate that a reservoir must be filled up, or for instance when a sprayer device optionally present therein switches on.

An signalling function, which gives the user feedback regarding the state of the device, can also be imparted to the light source by means of smart software. Besides information in the case of malfunction, for instance indicated by static red, the light source can for instance light up in blue during active cooling, wherein a dynamic play of light which for instance moves along the ring at an adjustable speed furthermore indicates an intensity of the cooling or other operating state. Conditioning can for instance be indicated with a counter-clockwise play of light as a sign that the process of decay is being delayed. This will also serve unequivocally as a motivation for the user to more consciously consume the fresh produce on a regular basis, for instance in that the light source lights up every hour or every part of an hour in a determined colour, such as violet, as a reminder thereof. A combination is likewise possible, wherein both operation and motivation are represented by a colour change. This creates a particularly attractive aesthetic effect in all cases.

A further preferred embodiment of the device has the feature according to the invention that the receptacle comprises one or more sensors from a group of sensors which are able and configured to record a relative air humidity and/or temperature inside the chamber or around the receptacle, which one or more sensors are coupled to a control unit of the receptacle. These sensors continuously record the (relative) air humidity and/or temperature respectively inside and outside the chamber. An aerosol delivery can be optimally adapted thereto in order to thus prevent an excess and to further limit the water consumption of the receptacle. For this purpose the receptacle provides a control unit which controls the sprayer device, the cooling device and/or the air displacing device on the basis of these measured values.

An embodiment of the device which is particularly intended to subject the fresh produce to the cooled airflow only preferably has the feature according to the invention that the perforations are in open communication with an outlet of the air displacing device and the at least one air channel with the inlet thereof. The cooled air is thus blown via the perforation directly into the chamber, whereby an optimal cooling is obtained. In order to obtain here a homogeneous distribution of the cooling air over the fresh produce a further embodiment of the device according to the invention has the feature here that the perforations comprise a system of perforations which extends from the bottom over a part of a height of the inner wall, particularly over at least a third of the height, more particularly over at least substantially half the height. This part of the inner wall is preferably flanked by an at least one second wall of a thermal conductor, particularly a metal wall which defines with the inner wall the at least one air channel and which is in thermal contact with the cold side of the cooling device. This significantly enhances a homogenous cold distribution over the bottom of the chamber.

Remarkably good results have in this respect been achieved with a further preferred embodiment of the device according to the invention, which is characterized here in that the system comprises a regular pattern of perforations, particularly perforations which each lie at a mathematically determined position, more particularly along a mathematical curve. This mathematical approach and the resulting curve bring about an optimal distribution of the airflow over the space in the chamber.

The invention will now be further elucidated on the basis of an exemplary embodiment and an accompanying drawing. In the drawing.

It is noted here that the figures are purely schematic and not drawn to scale. Some dimensions in particular may be exaggerated to greater or lesser extent for the sake of clarity. Corresponding parts are generally designated in the figures with the same reference numeral.

Figure 1A:
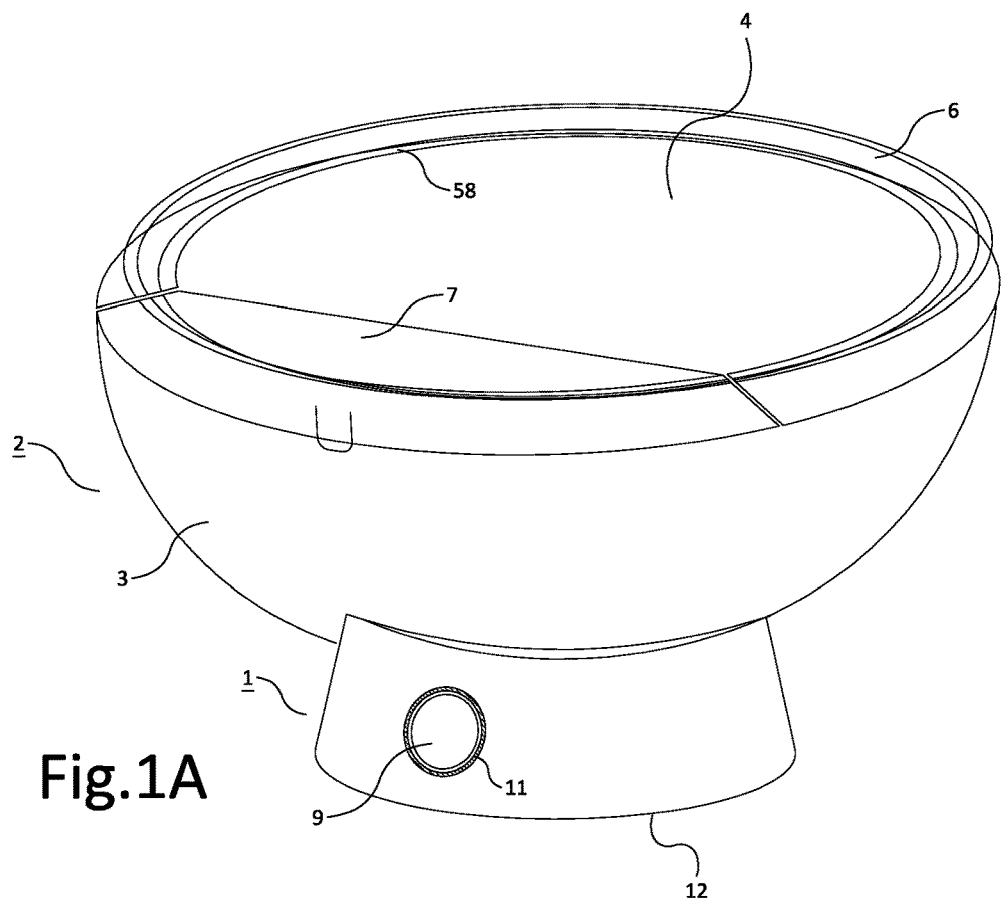
FIGS. 1A-1B show an isometric view of a first exemplary embodiment of a device according to the invention in respectively front view and rear view.

The device of FIGS. 1-4 comprises a hollow pedestal 1 on which a cup-shaped bowl 2 rests. Bowl 2 comprises a chamber 4 which is enclosed by a wall 3 of the bowl and in which fresh produce, in this case particularly fruit, can be received. For this purpose chamber 4 is accessible on an upper side over its full cross-section via an opening 5 which is bounded by an edge 6 of the wall 3 of bowl 2. On a front side, see FIG. 1A, the bowl comprises a detachable or removable water reservoir 7 which feeds a sprayer device which will be further described hereinbelow and which gives off an aerosol in chamber 4 via an aerosol inlet 58 in edge 6. The bowl is advantageously constructed at relatively low cost from parts of a suitable plastic, such as ABS, by means of injection moulding. If desired, an outer shell of the bowl can for instance be provided with a metallic or high-gloss coating in order to give the device a luxurious appearance. For this same purpose the outer shell of bowl 2 can also be partially or even wholly formed from or covered with metal or a natural product such as wood or textile. In order to allow a direct visual inspection of a liquid level the reservoir 7 can be formed from a transparent plastic such as polycarbonate, or a transparent window can be provided therein.

Figure 1B:
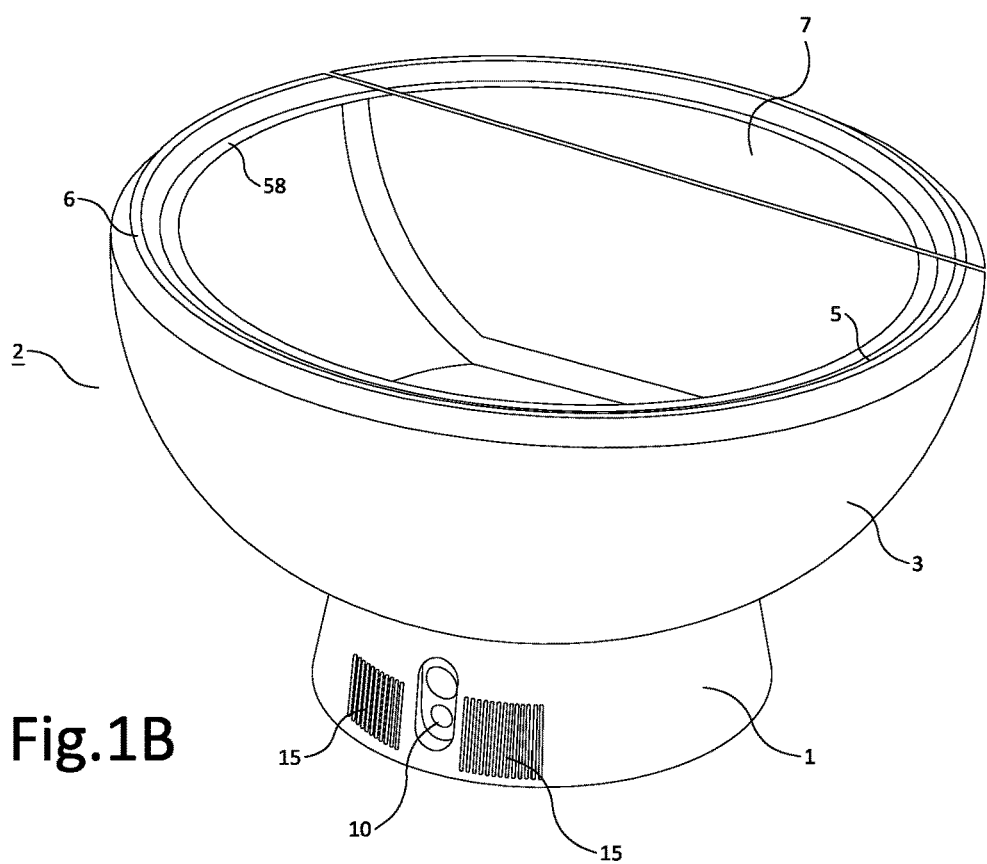
Figure 2:
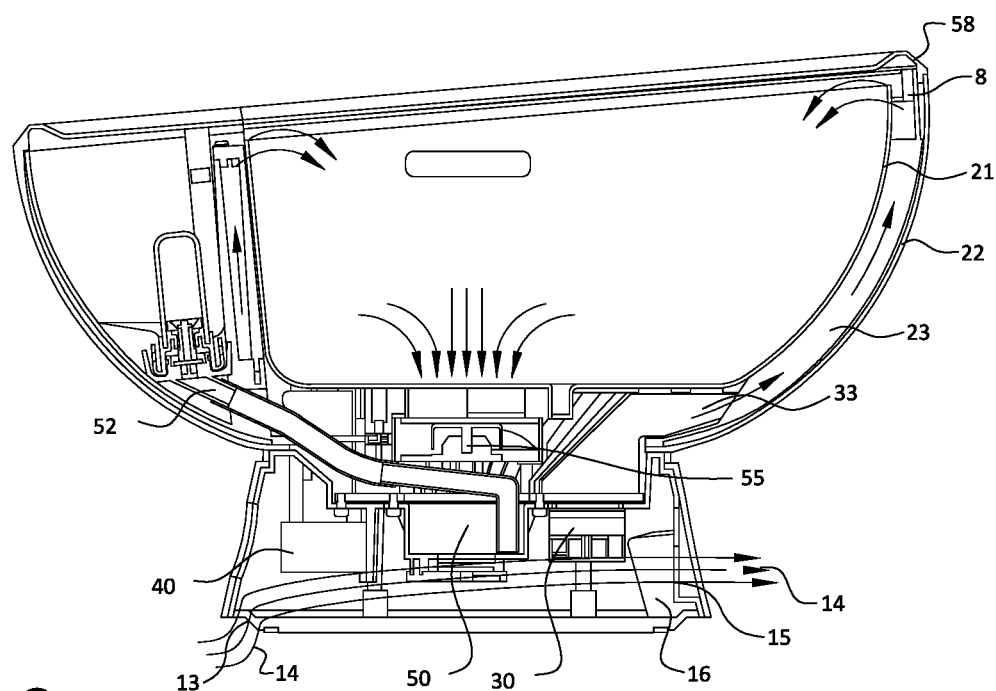
FIG. 2 shows a cross-section of the device of FIG. 1.
Figure 3:
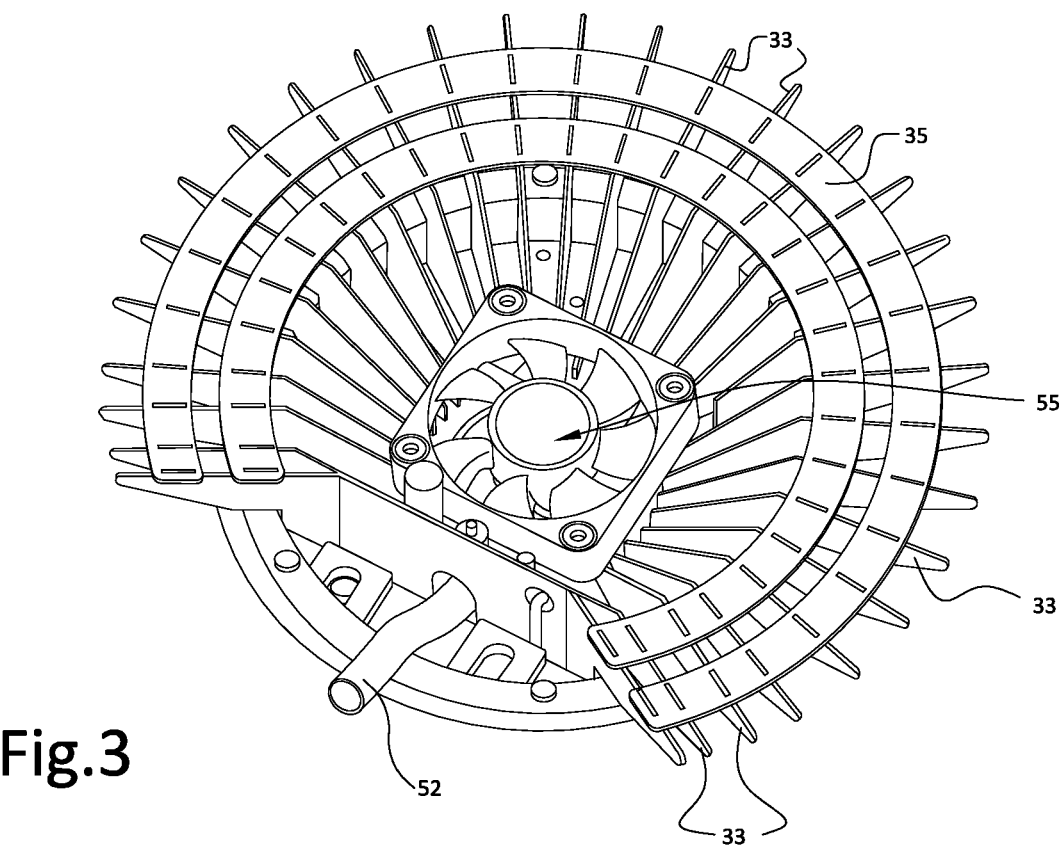
FIG. 3 shows a cut-away top view of the cooling device in the device of FIG. 1.
Figure 4:
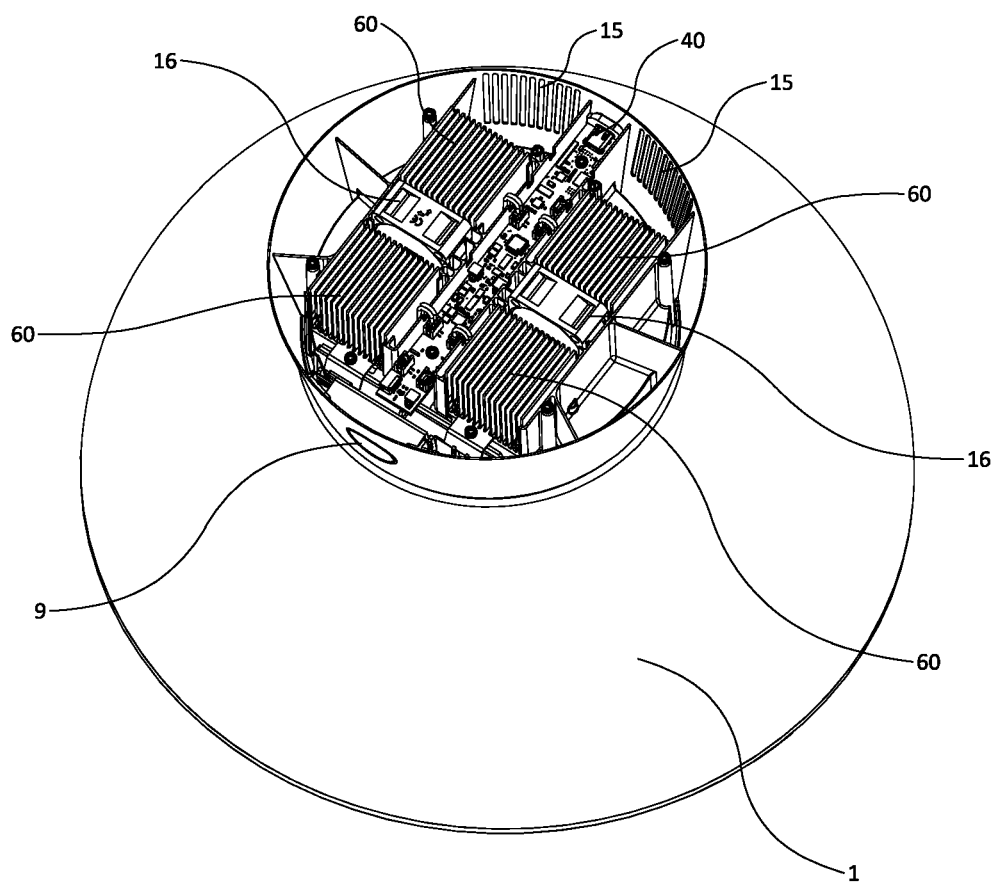
FIG. 4 shows a cut-away bottom view of the device of FIG. 1.

Pedestal 1 comprises on the front side a main control switch 9 with which the device can be switched on or off. Provided on a rear side, see FIG. 1B, is a connection for an electric power supply of the device. In this example use is made for this purpose of a standard port for a plug of a standard external power supply adapter which provides the device with a 12 Volt DC power supply. Provided on the front side is a status indicator 11 in the form of an LED ring 11 which represents a current status of a device by lighting up in a specific colour, for instance green for normal operation and orange or red to indicate respectively that the liquid level in the liquid reservoir is approaching or has reached a minimum. The LED ring 11 is arranged around main switch 9. If desired, a continuous operation of this LED ring can be switched off by means of a switch provided for this purpose or a separate user interface, such as a smart phone, wherein the LED ring will always light up in the event of a status warning. In order to achieve an attractive aesthetic effect an LED ring 8, see FIG. 2, is also accommodated in the edge 6 around the opening 5 of chamber 4, which ring can be controlled to have different colours. This LED ring 8 can also be set via a switch or an app of a smart phone provided for this purpose.

Pedestal 1 is hollow internally so as to provide space to various operational components of the device, which will be elucidated further hereinbelow. An air inlet 13 on a front side in the form of a wide gap at the bottom of the pedestal, see FIG. 2, provides for an air supply to the cavity, which can escape via a set of air outlets 15 on the rear side, see FIG. 1B. Just as bowl 2, pedestal 1 can advantageously be constructed at relatively low cost from parts of a suitable plastic, such as ABS, although it is here also possible to opt for a more luxurious finish by providing at least the outer shell of pedestal 1 with a metallic or high-gloss coating. For this same purpose the outer shell of pedestal 1 can also be partially or even wholly formed from or be covered with metal or a natural product such as wood or textile.

The construction of the device is further elucidated in the cross-section of FIG. 2. Bowl 2 is double-walled and comprises an inner wall 21 and a second wall 22 which falls round the inner wall and maintains a mutual cavity 25 relative to inner wall 21. Inner wall 21 bounds here the chamber 4 in which the product is received, while second wall 22 also forms an outer shell of the device in this example. The two bowls 21, 22 are held at a mutual distance by a set of spacers 24 which divide the cavity into a number of adjacent cavity channels 25. At the bottom of the receptacle 2 the inner wall 21 is supported by a set of metal cooling ribs 33, see also FIG. 3, which extend from a cooling body 35 and are formed together therewith from a good thermal conductor. In this example cooling body 35 is formed together with cooling ribs 33 as an integral whole in the form of an aluminium casting.

Cooling ribs 33 not only support the inner wall 21 but mainly function as cooling fins of the cooling body 35 which is thermally coupled to the cold side of an active heat exchanger, for which purpose use is in this example made of a set of Peltier elements 30. The Peltier elements 30 are provided on their warm side with a heat sink 60 with fan 16, see also FIG. 4, in order to adequately discharge heat extracted from cavity 25 via cooling body 35 and cooling ribs 33. For this purpose one or more fans 16 in pedestal 1 maintain an airflow 14 from the air inlet 13 to the air outlets 15 in order to relinquish this heat to the surrounding area. Temperature sensors at the Peltier elements 30 record a temperature of the cooling body 35 in situ and exchange this information with a central control unit 40 in pedestal 1.

The control unit 40 controls particularly a sprayer device 50 which is accommodated centrally in the pedestal. The sprayer device comprises an ultrasonic electromechanical nozzle, provided with a piezoelectric transducer, which is fed from water reservoir 7 via a liquid conduit 52 provided for this purpose. A switchable valve or reversible (peristaltic) pump, which is coupled to and controlled by control unit 40 in order to supply water as soon as a water bath in spraying device 50 requests it, can optionally be provided in the liquid conduit 52. For such a pump use is preferably made of a quiet running peristaltic or gear pump which pumps in the order of 100-200 ml/minute. The water reservoir is provided with an electronic level sensor which is likewise coupled to control unit 40 and generates a warning when water reservoir 7 is in danger of becoming depleted. This is for instance a Reed contact which is arranged adjacently of the water reservoir and which communicates with a float in water reservoir 7.

The Piezo-element of the spraying device acts ultrasonically on the liquid in order to form a fine mist therefrom. Arranged adjacently of spraying device 50 is an air displacing device 55 in the form of a central fan which maintains an airflow in which the formed aerosol is entrained. This airflow carries the aerosol along the cooling ribs 33 and via an air channel, which is formed by a cavity channel 25, to an air inlet 58 which also forms the aerosol inlet 58 and which is directed towards the interior of the chamber 4. The formed and cooled mist spreads over the chamber and the fresh produce, such as particularly fruit, located therein. An optimal air humidity and temperature, which protects the fresh produce against drying out prematurely and thereby keeps it in edible condition for longer, will thus always prevail in the chamber. The airflow is fed back over the spraying device by the fan 55 via an outlet at the bottom of bowl 2, whereby a continuous air circulation in chamber 4 is maintained.

Provided in and outside receptacle 2 are sensors (not further shown), such as an air humidity sensor and a temperature sensor, which continuously record the climate in chamber 4 and share this with the control unit 40. Control unit 40 moreover receives measurement data from optional further sensors, such as the temperature sensors of the Peltier coolers 30, a temperature sensor of the cooling body 35, a power sensor of the fan for indicating the current air displacement, and a liquid level sensor of the liquid level in reservoir 7. On the basis of the measurement data exchanged with the control unit the control is able to monitor the process and, where necessary, adjust it in order to maintain optimal conditions for the fresh produce in the chamber. A temperature and air humidity in the chamber are here particularly monitored by control device 40 subject to the fresh produce, and adjusted if necessary, in combination with an optimal air circulation over the fresh produce. The following table provides in this respect exemplary values for an ideal air humidity and storage temperature for a number of types of vegetable and fruit:

| Produce | Storage conditions | | |
|---|---|---|---|
| | Temperature | Air humidity (Rv) | Air circulation |
| Apple | minimal | 95% | continuous |
| Apricot | minimal | 85-95% | continuous |
| Grapes | minimal | 85-95% | continuous |
| Avocado | 7° C. | 85-95% | continuous |
| Tomato | 8-15° C. | 85% | continuous |
| Lemon, Grapefruit, Orange | 13° C. | 85-90% | continuous |
| Strawberry | 8-15° C. | 100% | periodic |
| Mandarin orange | 7° C. | 85-90% | continuous |
| Aubergine | 7° C. | 90-95% | continuous |
| Pepper | 8-18° C. | 90% | periodic |
| Pineapple | 13° C. | 85-91% | continuous |
| Leaf vegetables general | minimal | 100% | continuous |
| Dried fruits | minimal | 55-60% | continuous |
| Courgette | 7° C. | 95% | continuous |

Provided close to aerosol inlet 58 is a light source in the form of an LED ring 8 which extends all around and adds a play of light to the entering mist as an additional aesthetic effect. If desired, pedestal 1 additionally provides space for various accessories (not further shown), such as for instance a loud speaker/microphone combination which enables the device to be used as audio player and recorder. In combination with a telecommunications module serving for this purpose, such as for instance a Bluetooth or Wi-Fi chip and antenna, a connection can be made to for instance a smart phone or (tablet) computer. This moreover provides a means for exchanging the current status of the device and the storage conditions in the chamber with a user via an application serving for this purpose, which was installed on such an electronic device for this purpose and which can furthermore provide for a control of the device.

The range of sensors can also be expanded and comprise for instance a weight sensor which measures a weight of the actual fresh produce content in chamber 4 and generates this as a value to the control device. On the basis thereof the mist delivery can be adjusted and optionally be limited, and the user can thereby also be provided with current information regarding his/her fruit stock and an order can optionally be placed automatically in order to replenish the supply.

Figure 5:
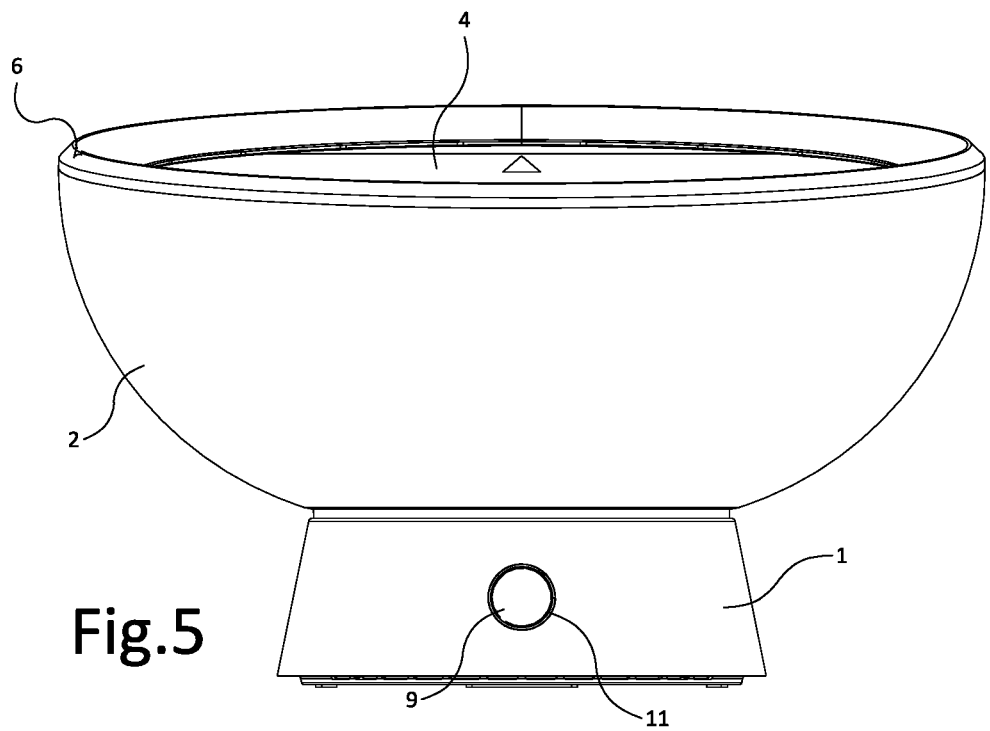
FIG. 5 shows an isometric view of a second exemplary embodiment of a device according to the invention.
Figure 6:
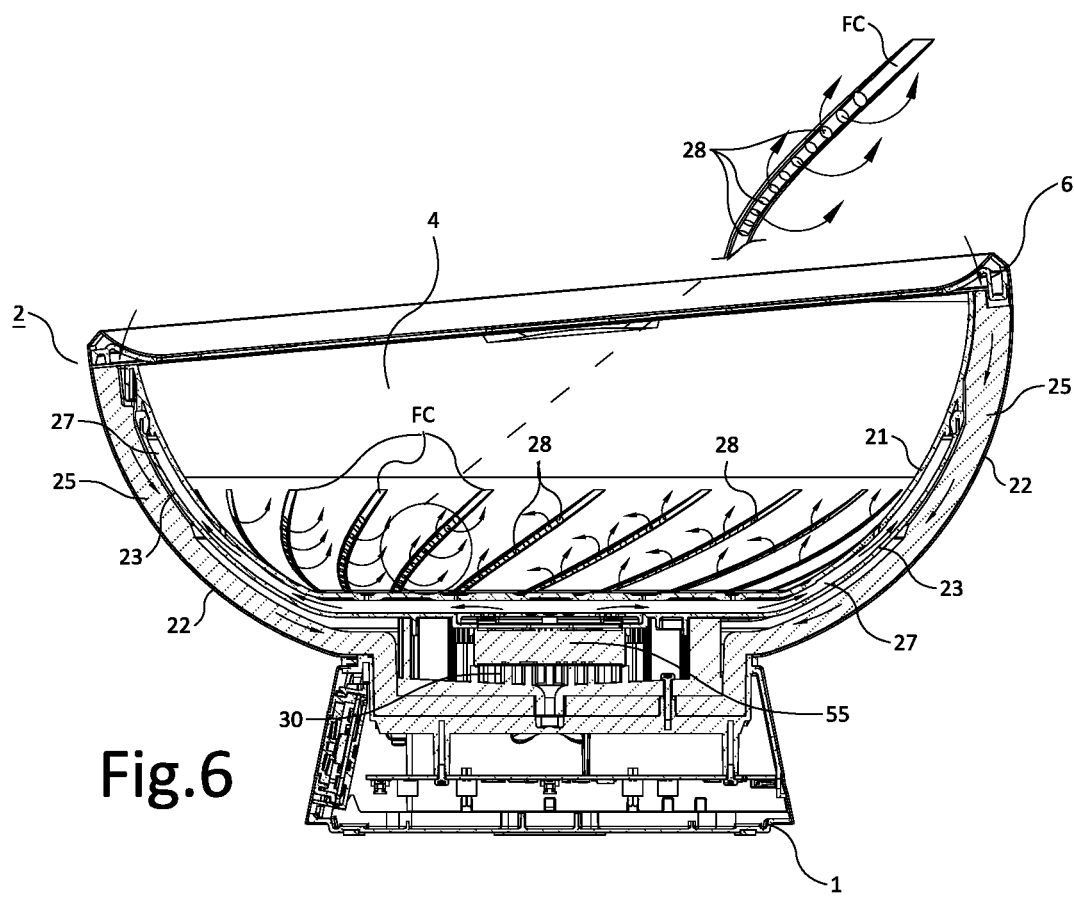
FIG. 6 shows a partly cut-away side view and cross-section of the device of FIG. 5.

FIGS. 5 and 6 show a second embodiment of the device according to the invention. The device is largely similar to that of the first exemplary embodiment. However, other than in the first exemplary embodiment, this is a device in which only a cooled airflow is maintained in the chamber. A removable liquid reservoir is therefore absent, and no sprayer device is provided therein either. This provides additional space for building in in pedestal 1, and chamber 4 for containing fresh produce, such as particularly fruit, is also more amply dimensioned with the same external dimensions of the receptacle.

An important distinction is further that the air displacing device in the form of a powerful fan 55 in this case imparts an opposite flow direction to the airflow. The flow direction is shown with arrows in the figure for the purpose of elucidation. Besides a second wall in the form of an outer shell 22, the wall of the chamber further also comprises in this example a second wall in the form of an intermediate wall 23, these both surrounding the inner wall 21 over at least a part of the height thereof and bounding an air channel 25, 27. The cup-shaped inner wall 21 is covered from the bottom and over a large part of a height thereof with a system of perforations 28 which are in open communication with an outlet of the air displacing means 55 so as to receive a cooled airflow therefrom. The fan 55 which is responsible therefor is moreover placed downstream of cooling device 30 for the purpose of a better efficiency. The cooled airflow is received in a cavity 27 between inner wall 21 and intermediate wall 23. The intermediate wall is here preferably formed from metal, for instance by deep drawing a sheet body, and thermally coupled to the cold side of cooling device 30. The conductive inner wall thus provides for a homogenous thermal distribution over the intermediate cavity 27 so that the cooled airflow will enter the chamber through the perforations with substantially the same temperature.

The cavity 27 thus created between intermediate wall 23 and the bottom of inner wall 21 furthermore provides a chamber in which a pressure buildup and balancing occurs between the air displacing means on one hand and the perforations on the other. This functions as a plenum whereby which the airflow through the different perforations will be substantially the same, irrespective of the position relative to the air displacing means.

In this example the system of perforations 28 extends over about half the height of the inner wall and the perforations are here placed as points on mathematical curves FC in mathematically determined manner, in this example in accordance with a Fibonacci sequence. The curves thereby spiral radially outward from a centre, whereby the perforations produce an optimal flow pattern. Because the airflow is moreover carried directly from the cooling means, through the bottom of the receptacle to the fresh produce, an energy loss (i.e. heating of the airflow) is limited to a minimum. Both effects together ensure that the fresh produce has a considerably longer shelf life and remains in good condition for a long time.

Any condensation in the bowl is also counteracted in that an imminent surplus of water vapour is entrained in the forced airflow. This can escape to the environment on the upper side of the bowl instead of being fed back into the device. A fresh airflow is drawn in at the peripheral edge of the bowl and carried via the air channels in the cavity to the inlet side of the cooling device and air displacing device.

On the upper side of the chamber the cooled airflow is captured at least partially in a gap between the inner wall 21 and the outer shell 22, wherein fresh air can likewise be drawn in. The thus admitted airflow is carried (back) to the air displacing means via the cavity 25 between outer shell 22 and inner wall 21 or intermediate wall 23.

All in all, the invention provides an interactive device for fresh produce, such as fruit in the example, whereby a user will keep the produce fresh for longer and which gives the user insight and control in respect of the conditions in which the produce is kept.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art. The exemplary embodiments are thus based on a receptacle which is completely open from the top, but the chamber therein can also be wholly or partially covered with a lid or an optionally framed insect screen for the purpose of a further covering of the fresh produce contained therein.

The invention claimed is:

1. A device for keeping fresh produce conditioned, particularly for fruit, comprising a receptacle with a substantially cup-shaped chamber which is enclosed by a wall and in which the fresh produce can be received, and conditioning means intended and configured to influence an ambient climate in the chamber, wherein the wall comprises adjacently of the chamber an inner wall which defines a bottom of and a peripheral edge remote from the bottom of the chamber, wherein the wall comprises at least one second wall which maintains an intermediate cavity with the inner wall, wherein the conditioning means comprise at least a cooling device and at least an air displacing device, wherein the air displacing device is able and configured to generate and maintain, optionally intermittently, a forced airflow during operation, wherein the cooling device is able and configured to enter on a cold side thereof into heat-exchanging contact with the airflow and to extract heat therefrom, wherein the cavity comprises at least one air channel which is in open communication with the air displacing device so as to guide the forced airflow at least partially, and wherein the inner wall is provided in the bottom with perforations which maintain an open communication between the chamber and at least one of the at least one air channel.

2. The device of claim 1, wherein the at least one second wall comprises an outer shell of the device, that the inner wall and the outer shell maintain relative to each other at the peripheral edge an air gap directed toward the chamber and that the at least one air channel opens into the air gap.

3. The device of claim 1, wherein the at least one second wall comprises an intermediate wall between an outer shell of the device and the inner wall, and that the intermediate wall defines together with the bottom of the inner wall a chamber which is in open communication with the outlet of the air displacing means.

4. The device of claim 3, wherein the intermediate wall comprises a thermal conductor, particularly is formed from metal, which is in heat-exchanging contact with the cold side of the cooling device.

5. The device of claim 1, wherein the cooling device comprises a heat exchanger which is thermally coupled to a cooling body with cooling ribs which are in heat-exchanging contact with the airflow.

6. The device of claim 5, wherein the heat exchanger comprises at least one Peltier element.

7. The device of claim 1, wherein the air displacing device comprises at least an electrically driven fan.

8. The device of claim 1, wherein the inner wall and at least one of the at least one second wall are spatially separated from each other by a number of spacers which extend therebetween in a transverse direction and which mutually bound a number of individual cavity channels, and that the cavity channels each comprise an air channel through which the airflow is maintained, at least during operation.

9. The device of claim 1, wherein the conditioning means comprise at least one sprayer device which is able and configured to generate during operation and optionally intermittently an aerosol from a liquid and deliver it to the airflow, wherein the at least one air channel is in open communication with the outlet of the air displacing device.

10. The device of claim 9, wherein the sprayer device comprises an ultrasonic nozzle with an electromechanical transducer, particularly a piezoelectric transducer, which is intended and configured to act with an ultrasonically energizable nozzle member on a liquid, particularly water, and form the aerosol therefrom.

11. The device of claim 9, wherein the sprayer device comprises at least one jet sprayer with a spray nozzle which is provided with at least one continuous spray opening and is intended and configured to receive at an inlet a liquid, particularly water, under increased pressure and to give off the liquid in the form of the aerosol at an outlet of the spray opening.

12. The device of claim 11, wherein the spray nozzle is arranged in or close to the peripheral edge and is oriented with the outlet toward the interior of the chamber.

13. The device of claim 9, wherein a liquid conduit connects the sprayer device to a liquid reservoir and that the liquid conduit extends in the cavity between the inner wall and the at least one second wall.

14. The device of claim 9, wherein the liquid reservoir forms a removable part of the receptacle and is in permanent or switched connection with the sprayer device.

15. The device of claim 1, wherein the receptacle comprises a bowl which supports on a hollow pedestal and that the conditioning means are accommodated at least largely in the pedestal.

16. The device of claim 1, wherein at least one light source is provided therein for the purpose of visibly displaying a lighting effect, particularly an annular light source, more particularly in the form of one or more LEDs.

17. The device of claim 1, wherein the perforations are in open communication with an outlet of the air displacing device and the at least one air channel with the inlet thereof.

18. The device of claim 1, wherein the perforations comprise a system of perforations which extends from the bottom over a part of a height of the inner wall, particularly over at least a third of the height, more particularly over at least substantially half the height.

19. The device of claim 18, wherein the system comprises a regular pattern of perforations, particularly perforations which each lie at a mathematically determined position, more particularly along a mathematical curve.

20. The device of claim 1, wherein the receptacle comprises one or more sensors from a group of sensors which are able and configured to record a relative air humidity and/or temperature inside the chamber or around the receptacle, which one or more sensors are coupled to a control unit of the receptacle.

* * * * *